US012340723B2

(12) United States Patent
Song et al.

(10) Patent No.: US 12,340,723 B2
(45) Date of Patent: Jun. 24, 2025

(54) DISPLAY DEVICE AND DRIVING METHOD THEREOF

(71) Applicant: SAMSUNG DISPLAY CO., LTD., Yongin-si (KR)

(72) Inventors: Seok Jeong Song, Yongin-si (KR); Jong Woong Park, Yongin-si (KR); Ji Yeon Baik, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/671,367

(22) Filed: May 22, 2024

(65) Prior Publication Data

US 2025/0140153 A1 May 1, 2025

(30) Foreign Application Priority Data

Oct. 26, 2023 (KR) ........................ 10-2023-0145025

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0257* (2013.01)

(58) Field of Classification Search
CPC .... G09G 5/10; G09G 3/3275; G09G 2310/08; G09G 2320/0646; G09G 2320/0257
See application file for complete search history.

(56) References Cited

U.S. PATENT DOCUMENTS

| | | | | |
|---|---|---|---|---|
| 7,058,230 B2 * | 6/2006 | Chiba | G06T 9/007 | 375/240.03 |
| 7,289,161 B2 * | 10/2007 | Yamakawa | G09G 3/3611 | 345/611 |
| 7,605,787 B2 * | 10/2009 | Akutsu | G09G 3/36 | 345/87 |

(Continued)

FOREIGN PATENT DOCUMENTS

| | | |
|---|---|---|
| CN | 114387916 | 4/2022 |
| KR | 10-2022-0046464 | 4/2022 |

*Primary Examiner* — Olga V Merkoulova
(74) *Attorney, Agent, or Firm* — F. CHAU & ASSOCIATES, LLC

(57) ABSTRACT

A display device includes: a pixel; a grayscale converter that applies a compensation value to generate an output grayscale; and a controller that provides a data voltage corresponding to the output grayscale to the pixel. The grayscale converter generates first stress value and second stress value based on the output grayscale, adds the first stress value to a first stress accumulation value to which a first accumulation coefficient is applied to update the first stress accumulation value, adds the second stress value to a second stress accumulation value to which a second accumulation coefficient is applied to update the second stress accumulation value, and generates the compensation value based on the first stress accumulation value and the second stress accumulation value. The first accumulation coefficient and the second accumulation coefficient are different from each other.

20 Claims, 10 Drawing Sheets

(56) References Cited

U.S. PATENT DOCUMENTS

| | | | | |
|---|---|---|---|---|
| 2003/0194145 | A1* | 10/2003 | Chiba | G06T 9/007 382/243 |
| 2004/0145596 | A1* | 7/2004 | Yamakawa | G09G 3/3611 345/690 |
| 2007/0164946 | A1* | 7/2007 | Akutsu | G09G 3/36 345/87 |
| 2019/0130845 | A1* | 5/2019 | Han | G09G 3/3266 |
| 2022/0108667 | A1* | 4/2022 | Park | G09G 3/3233 |

* cited by examiner

DISPLAY DEVICE AND DRIVING METHOD THEREOF

CROSS-REFERENCE TO RELATED APPLICATION

This patent application claims priority under 35 U.S.C. § 119 (a) to Korean Patent Application No. 10-2023-0145025 filed in the Korean Intellectual Property Office on Oct. 26, 2023, the disclosure of which is incorporated by reference in its entirety herein.

(a) TECHNICAL FIELD

The present disclosure is directed to a display device and a driving method thereof.

(b) DISCUSSION OF RELATED ART

A display device is a connection medium between a user and information. Examples of a display device include a liquid crystal display device and an organic light emitting display device.

The display device displays an image by using a plurality of pixels. Each of the pixels includes a driving transistor. The driving transistor may control luminance of the pixel by adjusting an amount of driving current based on a voltage applied thereto.

When the display device displays a second image after displaying a first image, an afterimage of the first image may remain while displaying the second image. The afterimage may occur due to voltage stress applied to the driving transistor in response to the first image.

SUMMARY

At least one embodiment of the present disclosure provides a display device and a driving method thereof that may compensate for both short-term and mid-to long-term afterimages. An embodiment of the present disclosure provides a display device including: a pixel;

a grayscale converter; and a controller. The grayscale converter applies a compensation value to an input grayscale to generate an output grayscale. The controller provides a data voltage corresponding to the output grayscale to the pixel. The grayscale converter generates a first stress value and a second stress value based on the output grayscale, adds the first stress value to a first stress accumulation value to which a first accumulation coefficient is applied to update the first stress accumulation value, adds the second stress value to a second stress accumulation value to which a second accumulation coefficient is applied to update the second stress accumulation value, and generates the compensation value based on the first stress accumulation value and the second stress accumulation value. The first accumulation coefficient and the second accumulation coefficient are different from each other.

The first accumulation coefficient may be a preset parameter assuming that the data voltage is applied to the pixel during a first period, the second accumulation coefficient may be a preset parameter assuming that the data voltage is applied to the pixel during a second period, and the second period may be longer than the first period.

The second accumulation coefficient may be greater than the first accumulation coefficient.

The grayscale converter may generate the compensation value based on a first conversion accumulation value obtained by applying a first weight to the first stress accumulation value and a second conversion accumulation value obtained by applying a second weight to the second stress accumulation value.

The display device may further include a memory that stores the first conversion accumulation value and the second conversion accumulation value, wherein the first conversion accumulation value may be smaller than the first stress accumulation value, and the second conversion accumulation value may be smaller than the second stress accumulation value.

The grayscale converter may calculate the first stress accumulation value by applying a reciprocal of the first weight to the first conversion accumulation value read from the memory.

The grayscale converter may calculate the second stress accumulation value by applying a reciprocal of the second weight to the second conversion accumulation value read from the memory.

The grayscale converter may include a first logic circuit that converts the output grayscale into the first stress of a voltage domain; a second logic circuit that converts the output grayscale into the second stress of the voltage domain; a memory in which a first conversion accumulation value obtained by applying a first weight to the first stress accumulation value and a second conversion accumulation value obtained by applying a second weight to the second stress accumulation value are stored; a first accumulator that applies the reciprocal of the first weight to the first conversion accumulation value to calculate the first stress accumulation value and that adds the first stress value to the first stress accumulation value to which the first accumulation coefficient is applied to update the first stress accumulation value; a second accumulator that applies the reciprocal of the second weight to the second conversion accumulation value to calculate the second stress accumulation value and that adds the second stress value to the second stress accumulation value to which the second accumulation coefficient is applied to update the second stress accumulation value; and a third logic circuit that generates the compensation value based on the first conversion accumulation value and the second conversion accumulation value.

The number of bits representing the first stress value and the number of bits representing the second stress value may be different.

The number of bits representing the first stress value may be greater than the number of bits representing the second stress value.

Another embodiment of the present disclosure provides a driving method of a display device, including: generating a first stress value and a second stress value based on a grayscale for a current frame; adding the first stress value to a first stress accumulation value to which a first accumulation coefficient is applied to update the first stress accumulation value; adding the second stress value to a second stress accumulation value to which a second accumulation coefficient is applied to update the second stress accumulation value; generating a compensation value based on the first stress accumulation value and the second stress accumulation value; applying the compensation value to a grayscale for a next fame to generate an output grayscale; and providing a data voltage corresponding to the output grayscale to a pixel of the display device, wherein the first accumulation coefficient and the second accumulation coefficient are different from each other.

The first accumulation coefficient may be a preset parameter assuming that the data voltage is applied to the pixel during a first period, the second accumulation coefficient may be a preset parameter assuming that the data voltage is applied to the pixel during a second period, and the second period may be longer than the first period.

The second accumulation coefficient may be greater than the first accumulation coefficient.

The compensation value may be generated based on a first conversion accumulation value obtained by applying a first weight to the first stress accumulation value and a second conversion accumulation value obtained by applying a second weight to the second stress accumulation value.

The display device may include a memory that stores the first conversion accumulation value and the second conversion accumulation value, the first conversion accumulation value may be smaller than the first stress accumulation value, and the second conversion accumulation value may be smaller than the second stress accumulation value.

The display device may calculate the first stress accumulation value by applying a reciprocal of the first weight to the first conversion accumulation value read from the memory.

The display device may calculate the second stress accumulation value by applying a reciprocal of the second weight to the second conversion accumulation value read from the memory.

The generating of the compensation value may include converting the output grayscale into the first stress value of a voltage domain; converting the output grayscale into the second stress value of the voltage domain; reading the first conversion accumulation value and the second conversion accumulation value; applying the reciprocal of the first weight to the first conversion accumulation value to calculate the first stress accumulation value, and adding the first stress value to the first stress accumulation value to which the first accumulation coefficient is applied to update the first stress accumulation value; applying the reciprocal of the second weight to the second conversion accumulation value to calculate the second stress accumulation value, and adding the second stress value to the second stress accumulation value to which the second accumulation coefficient is applied to update the second stress accumulation value; storing the first conversion accumulation value obtained by applying the first weight to the first stress accumulation value and the second conversion accumulation value obtained by applying the second weight to the second stress accumulation value; and generating the compensation value based on the first conversion accumulation value and the second conversion accumulation value. The number of bits representing the first stress value and the number of bits representing the second stress value may be different.

The number of bits representing the first stress value may be greater than the number of bits representing the second stress value.

The display device and the driving method thereof according to the present disclosure may compensate for both short-term afterimages and mid-to long-term afterimages.

DETAILED DESCRIPTION

Figure 1:
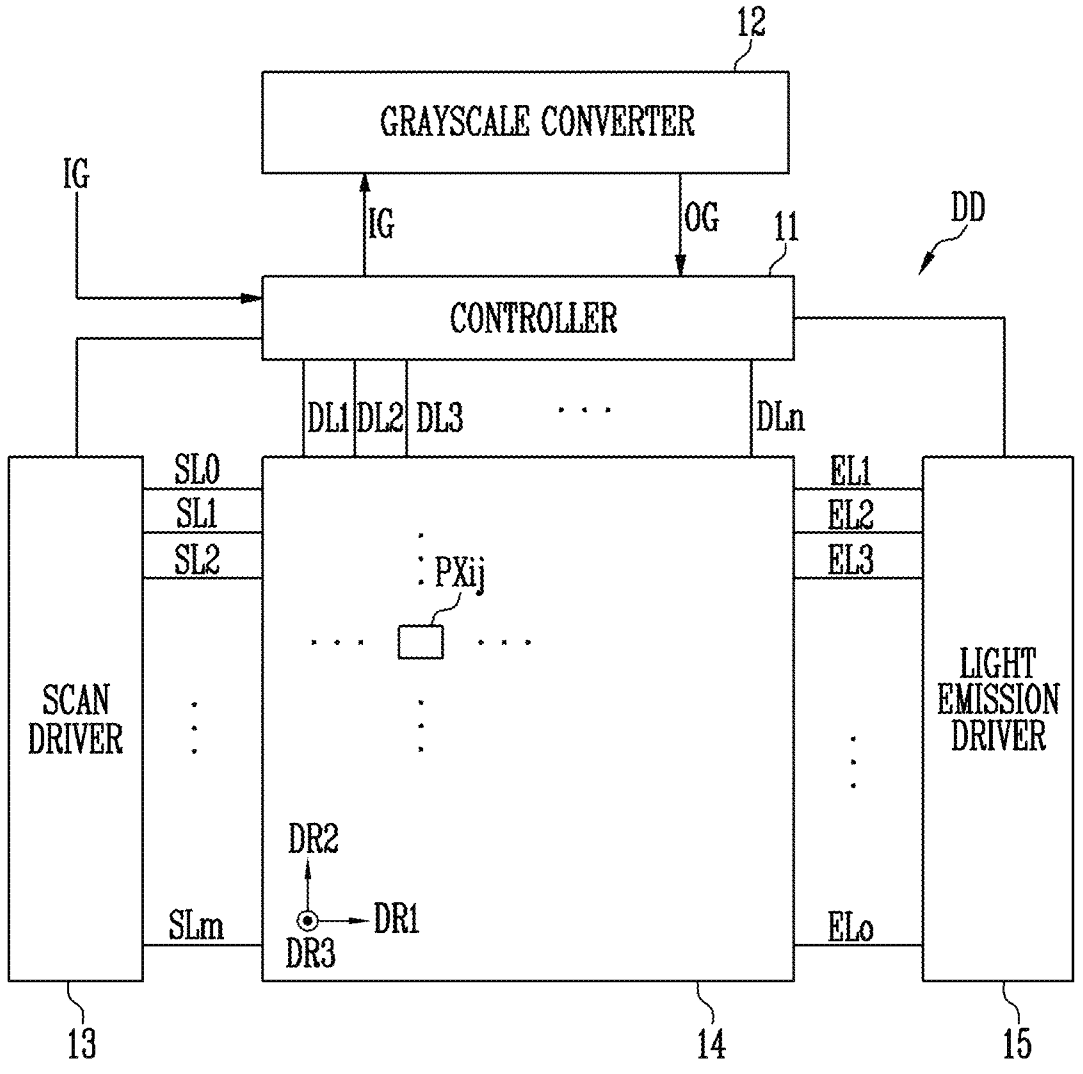
FIG. 1 is a drawing of a display device according to an embodiment of the present disclosure.

The present disclosure will be described more fully hereinafter with reference to the accompanying drawings, in which embodiments of the disclosure are shown. However, the described embodiments may be modified in various different ways, all without departing from the spirit or scope of the present disclosure.

To clearly describe the present disclosure, parts or portions that are irrelevant to the description are omitted, and identical or similar constituent elements throughout the specification are denoted by the same reference numerals.

Further, in the drawings, while elements of certain size and thickness are illustrated, and present disclosure is not necessarily limited to those illustrated in the drawings.

In addition, the expression "equal to or the same as" in the description may mean "substantially equal to or the same as". That is, it may be the same enough to convince those skilled in the art to be the same. Even other expressions may be expressions from which "substantially" is omitted.

FIG. 1 is a drawing for explaining a display device according to an embodiment of the present disclosure.

Referring to FIG. 1, a display device DD according to an embodiment includes a controller 11 (e.g., a control circuit), a grayscale converter 12 (e.g., a logic circuit), a scan driver 13 (e.g., a first driver circuit), a pixel portion 14 (e.g., a display panel), and a light emission driver (e.g., a second driver circuit).

The controller 11 may receive input grayscales IG for an image frame from an external processor. The processor may be an application processor (AP), a central processing unit (CPU), or a graphics processing unit (GPU).

The grayscale converter 12 may apply a compensation value to the input grayscales IG to convert them into output grayscales OG for the pixels. When the grayscale converter 12 and the controller 11 are configured of separate integrated chips (IC), the grayscale converter 12 may receive the input grayscales IG from the controller 11 and may provide the output grayscales OG to the controller 11. In another embodiment, the grayscale converter 12 and the controller 11 may be configured as a single integrated IC.

The controller 11 may provide data voltages to the pixels corresponding to the output grayscales OG. The input grayscales IG and the output grayscales OG may be digital signals, and the data voltages may be analog voltages. In another embodiment, the controller 11 may be configured separately as a timing controller and a data driver. In addition, the controller 11 may generate control signals for writing data voltages to the pixel portion 14 to provide the generated control signals to the scan driver 13 and the light emission driver 15. In another embodiment, the light emission driver 15 may be omitted depending on a structure of a pixel circuit of the pixel portion 14.

The controller 11 may apply data voltages to data lines DL1 to DLn in units of pixel rows (or in units of horizontal lines), where n may be an integer greater than zero. The pixel row may mean pixels connected to the same scan line (e.g., SL1) and light emitting line (e.g., EL1). The scan driver 13 may receive a clock signal and a scan start signal from the controller 11 to generate scan signals to be provided to scan lines (SL0, SL1, SL2, . . . , and SLm). For example, the scan driver 13 may sequentially provide scan signals having a turn-on level pulse to the scan lines SL1 to SLm, where m may be an integer greater than zero. For example, the scan driver 13 may be configured in the form of a shift register, and may generate the scan signals in a manner that sequentially transmits the scan start signal in the form of a pulse of a turn-on level to a next stage circuit according to control of the clock signal.

The light emission driver 15 may receive a clock signal and a light emitting stop signal from the controller 11 to generate light emitting signals to provide to light emission lines (EL1, EL2, EL3, . . . , and ELo). For example, the light emission driver 15 may sequentially provide light emitting signals having a pulse of a turn-off level to the light emitting lines EL1 to Elo, where o may be an integer greater than zero. For example, the light emission driver 15 may be configured in the form of a shift register, and may generate the light emitting signals in a manner that sequentially transmits the light emitting stop signal in the form of a pulse of a turn-off level to a next stage circuit according to control of the clock signal.

The pixel portion 14 includes the pixels. Each pixel PXij may be connected to a corresponding data line, scan line, and light emitting line, where i and j may each be an integer greater than 0. The pixel PXij may mean a pixel in which a scan transistor is connected to an i-th scan line and a j-th data line. The pixel PXij may emit light in one of a first color, a second color, and a third color.

The first color, the second color, and the third color may be different colors. For example, the first color may be one color of red, green, and blue, the second color may be one color of red, green, and blue excluding the first color, and the third color may be the remaining color of red, green, blue excluding the first and second colors. In addition, magenta, cyan, and yellow may be used instead of red, green, and blue as the first to third colors. However, in the present embodiment, it is assumed that the first color is red, the second color is green, and the third color is blue for better understanding and ease of description.

The pixel portion 14 may be disposed in various forms such as diamond PENTILE™, RGB-stripe, S-stripe, real RGB, and normal PENTILE™.

It is assumed that the pixels of the pixel portion 14 are arranged in a first direction DR1 and a second direction DR2 perpendicular to the first direction DR1. In addition, it is assumed that the light emitting direction of the pixels is a third direction DR3 perpendicular to the first direction DR1 and the second direction DR2.

Figure 2:
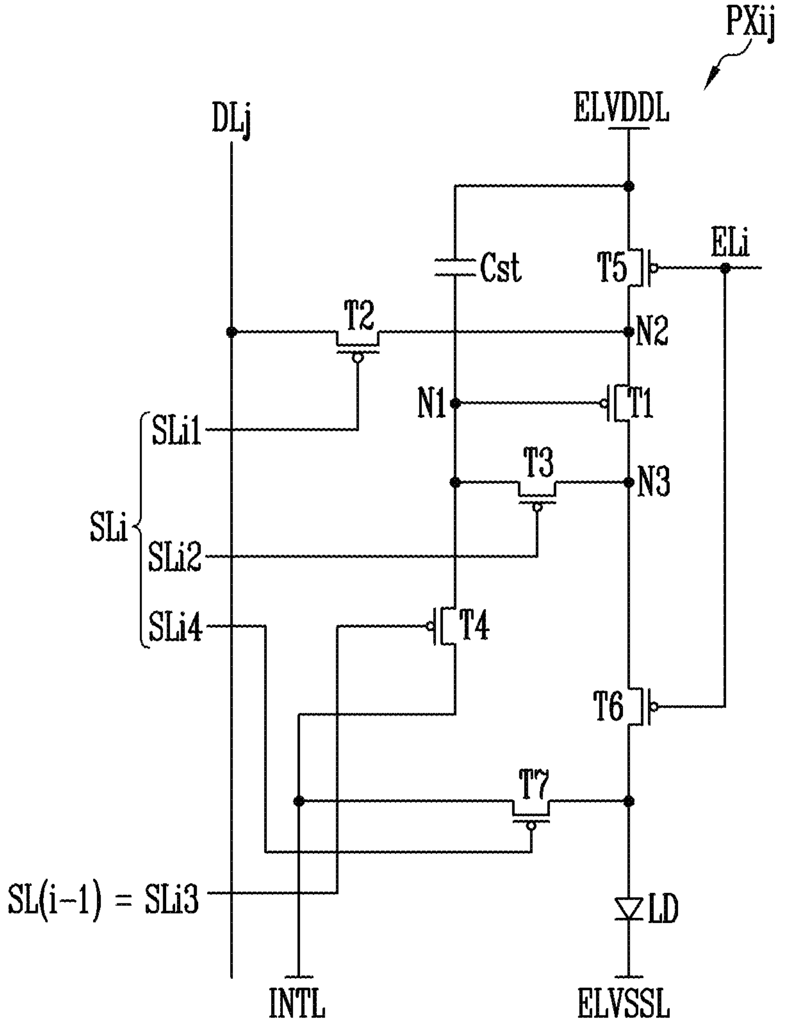
FIG. 2 is a drawing of a pixel of the display device according to an embodiment of the present disclosure.

FIG. 2 is a drawing for explaining a pixel according to an embodiment of the present disclosure.

Referring to FIG. 2, the pixel PXij includes transistors T1, T2, T3, T4, T5, T6, and T7, a storage capacitor Cst, and a light emitting element LD.

Hereinafter, a circuit (e.g., a pixel or pixel circuit) configured of a P-type transistor will be described as an example. However, the circuit is not limited thereto since the circuit may be configured of an N-type transistor by changing a polarity of a voltage applied to a gate terminal. In another embodiment, the circuit may be configured of a combination of a P-type of transistor and an N-type of transistor. The P-type of transistor refers to a transistor in which an amount of current increases when a voltage difference between a gate electrode and a source electrode increases in a negative direction. The N-type of transistor refers to a transistor in which an amount of current increases when a voltage difference between a gate electrode and a source electrode increases in a positive direction. The transistor may of various types such as a thin film transistor (TFT), a field effect transistor (FET), and a bipolar junction transistor (BJT).

In the first transistor T1, a gate electrode may be connected to a first node N1, a first electrode may be connected to a second node N2, and a second electrode may be connected to a third node N3. The first transistor T1 may be referred to as a driving transistor.

In the second transistor T2, a gate electrode may be connected to a scan line SLi1, a first electrode may be connected to a data line DLj, and a second electrode may be connected to the second node N2. The second transistor T2 may be referred to as a scan transistor.

In the third transistor T3, a gate electrode may be connected to a scan line SLi2, a first electrode may be connected to the first node N1, and a second electrode may be connected to the third node N3. The third transistor T3 may be referred to as a diode-connection transistor.

In the fourth transistor T4, a gate electrode may be connected to a scan line SLi3, a first electrode may be connected to the first node N1, and a second electrode may be connected to an initialization line INTL. The fourth transistor T4 may be referred to as a gate initialization transistor.

In the fifth transistor T5, a gate electrode may be connected to an i-th light emitting line ELi, a first electrode may be connected to a first power line ELVDDL, and a second electrode may be connected to the second node N2. The fifth transistor T5 may be referred to as a light emitting transistor. In another embodiment, the gate electrode of the fifth transistor T5 may be connected to a light emitting line different from a light emitting line connected to a gate electrode of the sixth transistor T6.

In the sixth transistor T6, the gate electrode may be connected to the i-th light emitting line ELi, a first electrode may be connected to the third node N3, and a second electrode may be connected to an anode of the light emitting element LD. The sixth transistor T6 may be referred to as a light emitting transistor. In another embodiment, the gate electrode of the sixth transistor T6 may be connected to a light emitting line different from a light emitting line connected to the gate electrode of the fifth transistor T5.

In the seventh transistor T7, a gate electrode may be connected to a scan line SLi4, a first electrode may be connected to the initialization line INTL, and a second electrode may be connected to the anode of the light emitting element LD. The seventh transistor T7 may be referred to as a light emitting element initialization transistor.

A first electrode of the storage capacitor Cst may be connected to the first power line ELVDDL, and a second electrode thereof may be connected to the first node N1.

The anode of the light emitting element LD may be connected to the second electrode of the sixth transistor T6, and a cathode thereof may be connected to a second power line ELVSSL. The light emitting element LD may be a light emitting diode. The light emitting element LD may include an organic light emitting diode, an inorganic light emitting diode, and a quantum dot/well light emitting diode. In the present embodiment, only one light emitting element LD is provided in each pixel PXij, but in another embodiment, a plurality of light emitting elements may be provided in each pixel PXij. In this case, the plurality of light emitting elements may be connected in series, in parallel, or in series/parallel. The light emitting element LD of each pixel PXij may emit light of one of the first color, second color, and third color.

A first power source voltage may be applied to the first power line ELVDDL, a second power source voltage may be applied to the second power line ELVSSL, and an initialization voltage may be applied to the initialization line INTL. For example, the first power source voltage may be larger than the second power source voltage. For example, the initialization voltage may be equal to or larger than the second power source voltage. For example, the initialization voltage may correspond to a smallest one of the data voltages corresponding to the output grayscales. In another example, the initialization voltage may be smaller than data voltages corresponding to color grayscales.

Figure 3:
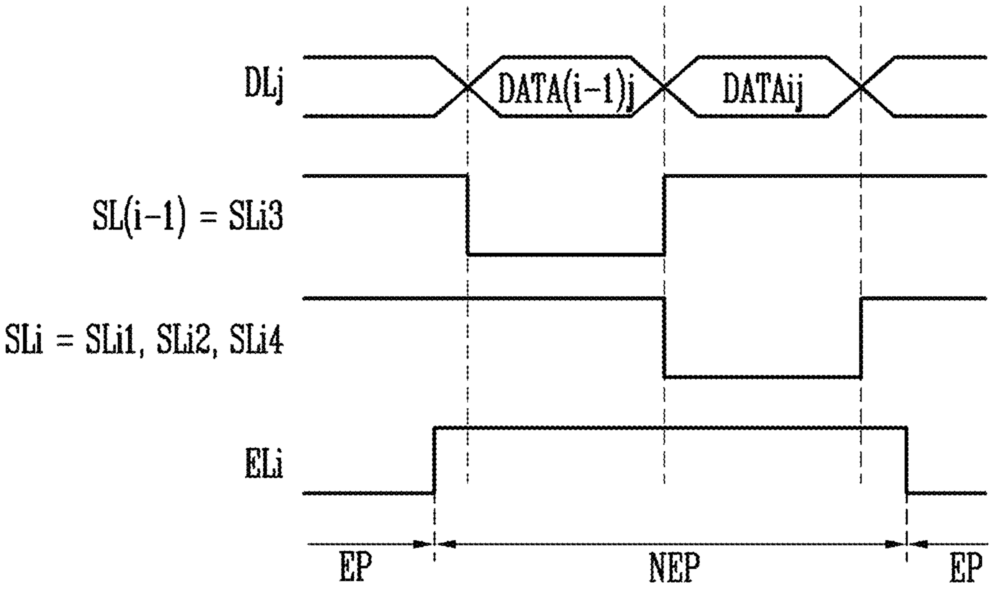
FIG. 3 illustrates a driving method of the pixel of FIG. 2.

FIG. 3 illustrates a driving method of the pixel of FIG. 2.

Hereinafter, for better understanding and ease of description, it is assumed that the scan lines SLi1, SLi2, and SLi4 are i-th scan lines SLi, and the scan line SLi3 is an (i−1)-th scan line SL(i−1). However, the scan lines SLi1, SLi2, SLi3, and SLi4 may have various connection relationships according to embodiments. For example, the scan line SLi4 may be the (i−1)-th scan line or the (i+1)-th scan line.

First, a light emitting signal having a turn-off level (logic high level) is applied to the i-th light emitting line ELi, a data voltage DATA (i−1)j for an (i−1)-th pixel is applied to the data line DLj, and a scan signal having a turn-on level (logic low level) is applied to the scan line SLi3. The high/low logic level may vary depending on whether the transistor is P-type or N-type.

In this case, since the scan signal having a turn-off level is applied to the scan lines SLi1 and SLi2, the second transistor T2 is in a turn-off state, and it prevents the data voltage DATA (i−1)j for the (i−1)-th pixel from being input to the i-th pixel PXij.

In this case, since the fourth transistor T4 is in a turned-on state, the first node N1 is connected to the initialization line INTL, so that a voltage of the first node N1 is initialized. Since the light emitting signal having a turn-off level is applied to the light emitting line ELi, the transistors T5 and T6 are in a turn-off state, and unnecessary light emitting of the light emitting element LD according to the initialization voltage application process is prevented.

Next, the data voltage DATAij for the i-th pixel PXij is applied to the data line DLj, and the scan signal having a turn-on level is applied to the scan lines SLi1 and SLi2. Accordingly, the transistors T2, T1, and T3 are turned on, and thus the data line DLj and the first node N1 are electrically connected. Accordingly, a compensation voltage obtained by subtracting a threshold voltage of the first transistor T1 from the data voltage DATAij is applied to the second electrode (that is, the first node N1) of the storage capacitor Cst, and the storage capacitor Cst maintains a voltage corresponding to a difference between the first power source voltage and the compensation voltage. This period may be referred to as a threshold voltage compensation period or data writing period.

In addition, when the scan line SLi4 is the i-th scan line, the seventh transistor T7 is turned on, so the anode of the light emitting element LD and the initialization line INTL are connected, and the light emitting element LD is initialized with an amount of charge corresponding to a voltage difference between the initialization voltage and the second power source voltage.

Thereafter, as the light emitting signal having a turn-on level is applied to the i-th light emitting line ELi, the transistors T5 and T6 may be turned on. Accordingly, a driving current path connecting the first power line ELVDDL, the fifth transistor T5, the first transistor T1, the sixth transistor T6, the light emitting element LD, and the second power line ELVSSL is formed.

An amount of driving current flowing through the first and second electrodes of the first transistor T1 is adjusted according to a voltage maintained in the storage capacitor Cst. The light emitting element LD emits light with a luminance corresponding to the amount of driving current. The light emitting element LD emits light until a light emitting signal of a turn-off level is applied to the light emitting line ELi.

When the light emitting signal has a turned-on level, pixels receiving the corresponding light emitting signal may be in a display state. Accordingly, a period in which the light emitting signal has the turned-on level may be referred to as a light emitting period EP (or a light emitting permissive period). In addition, when the light emitting signal has a turned-off level, pixels receiving the corresponding light emitting signal may be in a non-display state. Accordingly, a period in which the light emitting signal has the turned-off level may be referred to as a non-light emitting period NEP (or a light emitting non-permissive period).

The non-light emitting period NEP described in FIG. 3 may be used to prevent the pixel PXij from emitting light with an undesired luminance during the initialization period and the data writing period.

While data written in the pixel PXij is maintained (for example, one frame period), one or more non-light emitting periods NEP may be additionally provided. The one or more non-lighting emitting periods NEP may be used to effectively express a low gray level by reducing the light emitting period EP of the pixel PXij, or to smoothly blur the motion of an image.

Figure 4:
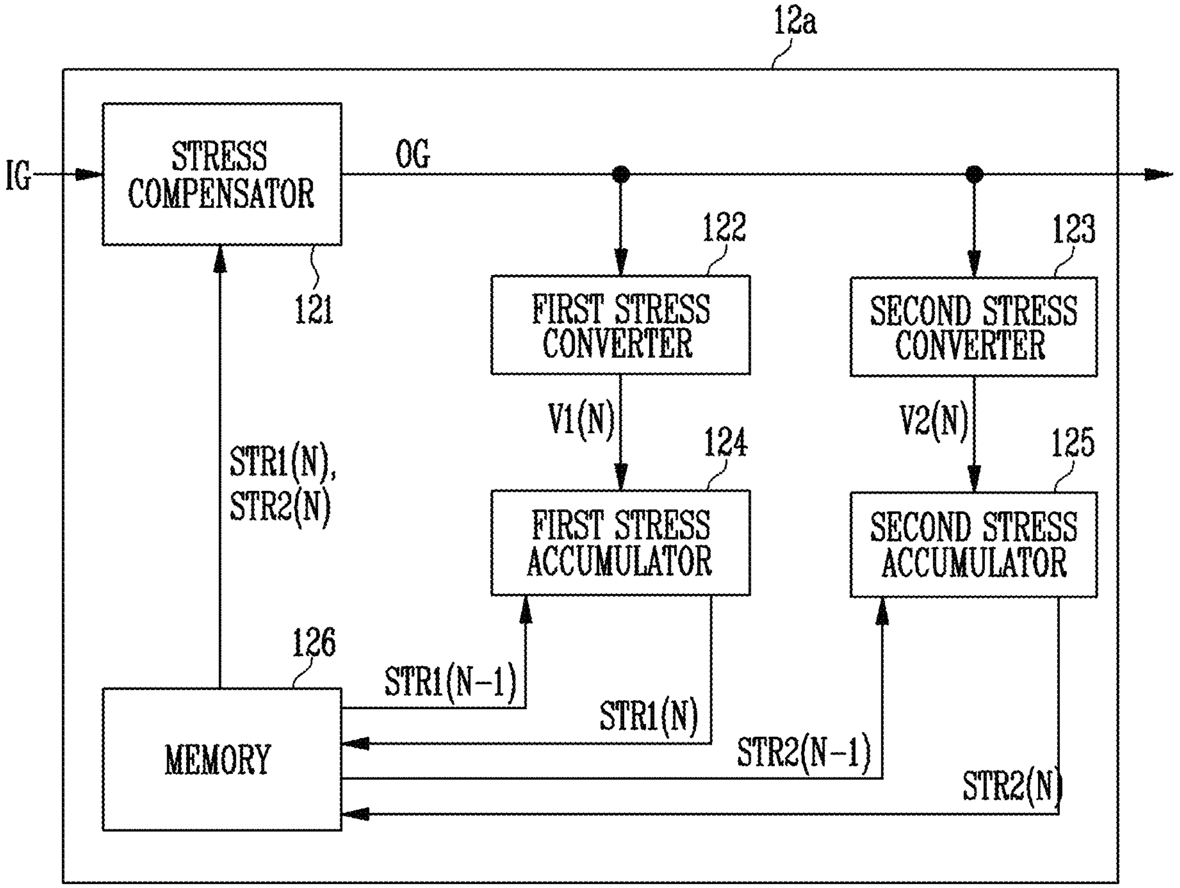
FIG. 4 is a drawing of a grayscale converter of the display device according to an embodiment of the present disclosure.

FIG. 4 is a drawing for explaining a grayscale converter according to an embodiment of the present disclosure.

Referring to FIG. 4, a grayscale converter 12*a* according to an embodiment includes a stress compensator 121 (e.g., a first logic circuit), a first stress converter 122 (e.g., a second logic circuit), a second stress converter 123 (e.g., a third logic circuit), a first stress accumulator 124, a second stress accumulator 125, and a memory 126.

Hereinafter, for better understanding and ease of description, one input grayscale IG and one output grayscale OG for one pixel PXij will be described. In the same way, the grayscale converter 12*a* may convert the input grayscales IG for all pixels included in the pixel portion 14 into the output grayscales OG.

The grayscale converter 12*a* may independently generate a first stress V1(N) (e.g., a first numerical value or voltage) and a second stress V2(N) (e.g., a second numerical value or voltage) based on the output grayscale OG. For example, the grayscale converter 12*a* may generate the stress values without receiving an input other than the input grayscales. In an embodiment, the grayscale converter 12*a* considers only the input grayscales in generating the stress values. The grayscale converter 12*a* may add the first stress V1(N) to a first stress accumulation value STR1(N−1) to which a first accumulation coefficient is applied to update a first stress accumulation value STR1(N). The grayscale converter 12*a* may add the second stress V2(N) to a second stress accumulation value (STR2(N−1)) to which a second accumulation coefficient is applied to update a second stress accumulation value STR2(N). In an embodiment, the grayscale converter 12*a* generates a compensation value based on the first stress accumulation value STR1(N) and the second stress accumulation value STR2(N). The grayscale converter 12*a* may apply the compensation value to the input grayscale IG to convert them into the output grayscale OG for the pixel PXij.

Hereinafter, it is assumed that the input grayscale IG and the output grayscale OG are values corresponding to the pixel PXij in an N-th image frame.

The first stress converter 122 may convert the output grayscale OG into the first stress V1(N) of a voltage domain. The first stress V1(N) may correspond to the output grayscale OG. When the output grayscale OG has a range of 0 to 255 expressed in 8 bits, the smaller the output grayscale OG (closer to black), the larger the first stress V1(N) may be. This is due to the fact that the first transistor T1 in FIG. 2 is configured of a P-type transistor. When the output grayscale OG is already a voltage domain value (for example, a voltage code or voltage value), the smaller the output grayscale OG, the smaller the first stress V1(N) may be. For example, the output grayscale OG may be the same as the first stress V1(N). However, even if the output grayscale OG is a value of the voltage domain, for logic optimization, the first stress converter 122 may generate the first stress V1(N) by applying a weight to the output grayscale OG to generate a first weighted value and quantizing the first weighted value.

The second stress converter 123 may convert the output grayscale OG into the second stress V2(N) of the voltage domain. The second stress V2(N) may correspond to the output grayscale OG. When the output grayscale OG has a range of 0 to 255 expressed in 8 bits, the smaller the output grayscale OG (closer to black), the larger the second stress V2(N) may be. This is due to the fact that the first transistor T1 in FIG. 2 is configured of a P-type transistor. When the output grayscale OG is already a voltage domain value (for example, a voltage code), the smaller the output grayscale OG, the smaller the second stress V2(N) may be. For example, the output grayscale OG may be the same as the second stress V2(N). However, even if the output grayscale OG is a value of the voltage domain, for logic optimization, the second stress converter 123 may generate the second stress V2(N) by applying a weight to the output grayscale OG to generate a second weighted value and quantizing the second weighted value.

The first accumulation coefficient is a preset parameter assuming that the data voltage is applied to the pixel PXij during the first period. The second accumulation coefficient is a preset parameter assuming that the data voltage is applied to the pixel PXij during the second period. In an embodiment, the second period is longer than the first period. That is, the first accumulation coefficient represents a short-term stress, and the second accumulation coefficient represents a mid-to long-term stress.

The number of bits representing the first stress V1(N) and the number of bits representing the second stress V2(N) may be different from each other. For example, the number of bits representing the first stress V1(N) may be greater than the number of bits representing the second stress V2(N). Since the second stress V2(N) corresponding to the mid-to long-term stress is less sensitive to a grayscale difference than the first stress V1(N) corresponding to the short-term stress, it is possible to reduce the number of bits. For example, the first stress V1(N) may be a value obtained by quantizing the output gray scale OG into 5 bits, and the second stress V2(N) may be a value obtained by quantizing the output gray scale OG into 4 bits.

The memory 126 may store the first stress accumulated value STR1(N−1) and the second stress accumulated value STR2(N−1) for the previous frames of the current frame. For example, when the current frame is the N-th frame, the first stress accumulation value STR1(N−1) may be short-term stresses accumulated during the 1st, 2nd, 3rd, . . . , (N−1)-th frames, and the second stress accumulation value STR2(N−1) may be mid-to long-term stresses accumulated during the 1st, 2nd, 3rd, . . . , (N−1)-th frames.

The first stress accumulator 124 may add the first stress V1(N) to the first stress accumulation value STR1(N−1) to which the first accumulation coefficient is applied to update the first stress accumulation value STR1(N) (see Equation 1).

$$STR1(N)=V1(N)+AC1*STR1(N-1) \quad \text{[Equation 1]}$$

Here, AC1 is the first accumulation coefficient. A method of deriving the first accumulation coefficient will be described later with reference to FIG. 5 to FIG. 10.

The second stress accumulator 125 may add the second stress V2(N) to the second stress accumulation value STR2(N−1) to which the second accumulation coefficient is applied to update the second stress accumulation value STR2(N) (see Equation 2).

$$STR2(N)=V2(N)+AC2*STR2(N-1) \quad \text{[Equation 2]}$$

Here, AC2 is the second accumulation coefficient. A method of deriving the second accumulation coefficient will be described later with reference to FIG. 5 to FIG. 10. In an embodiment, the first accumulation coefficient and the second accumulation coefficient are different from one another. For example, the second accumulation coefficient may be greater than the first accumulation coefficient.

The updated first stress accumulation value STR1(N) and the updated second stress accumulation value STR2(N) may be stored in the memory 126.

The stress compensator 121 may generate a compensation value based on the first stress accumulation value STR1(N) and the second stress accumulation value STR2(N). This compensation value may be applied to the input grayscale IG of the next frame (for example, (N+1)-th frame).

The stress compensator 121 calculates the final accumulation value by using the first stress accumulation value STR1(N) and the second stress accumulation value STR2(N). For example, the stress compensator 121 may calculate the final accumulation value based on the first conversion accumulation value obtained by applying the first weight to the first stress accumulation value STR1(N) and the second conversion accumulation value obtained by applying the second weight to the second stress accumulation value STR2(N) (see Equation 3).

$$STRsum(N)=K1*STR1(N)+K2*STR2(N) \quad \text{[Equation 3]}$$

Here, STRsum(N) is the final accumulation value. K1 is the first weight. In an embodiment, K1 is less than 1 and greater than 0. K2 is the second weight. In an embodiment, K2 is less than 1 and greater than 0. K1 and K2 may be coefficients predetermined as optimal values through repeated experiments. K1*STR1(N) may be referred to as the first conversion accumulation value. K2*STR2(N) may be referred to as the second conversion accumulation value.

The stress compensator 121 generates the compensation value using the final accumulation value (see Equation 4).

$$\text{compData}=(STRsum(N)-STR\exp(N))*GA \quad \text{[Equation 4]}$$

Here, compData is the compensation value, STRsum(N) is the final accumulation value, STRexp (N) is the expected accumulation value, and GA is the grayscale gain. The expected accumulation value may be the final accumulation value when the stress of V1(N) and V2(N) is continuously received from the 1st frame to the N-th frame. The grayscale gain may be applied differently for each grayscale or for each grayscale section.

The stress compensator 121 may convert the input grayscale IG into the output grayscale OG by applying the compensation value (compData, see Equation 4) for the pixel PXij. For example, when the units of the input grayscale IG, the compensation value, and the output grayscale OG are the same (for example, when the input grayscale IG, the compensation value, and the output grayscale OG are voltage domains), the stress compensator 121 may generate the output grayscale OG by adding the compensation value (compData) to the input grayscale IG.

FIG. 5 to FIG. 10 illustrate a method of calculating an accumulation coefficient according to an embodiment of the present disclosure.

Figure 5:
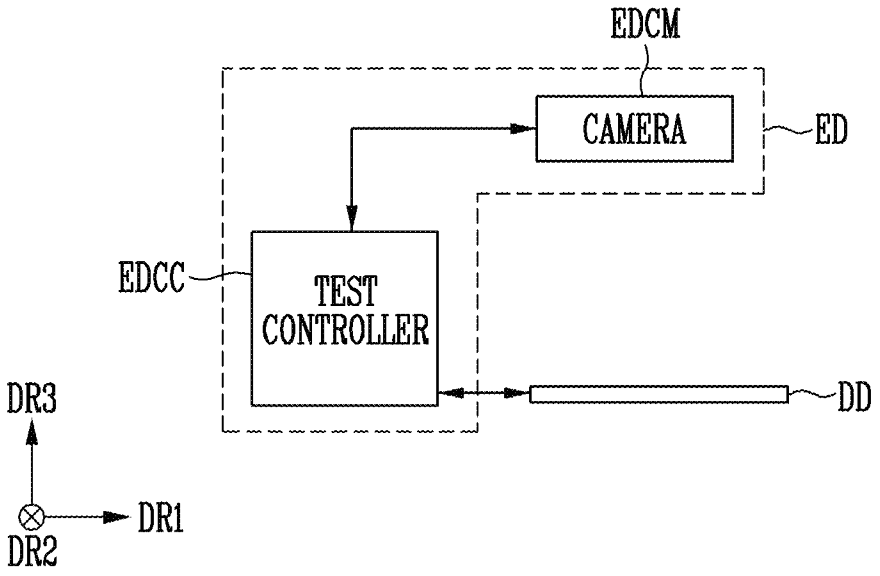
FIG. 5 to FIG. 10 illustrate a method of calculating accumulation coefficients according to an embodiment of the present disclosure.

Referring to FIG. 5, an accumulation coefficient generating device ED according to an embodiment includes a camera EDCM and a test controller EDCC (e.g., a controller circuit).

The camera EDCM may generate a camera image by capturing a test image displayed by the pixels of the display device DD. The first or second accumulation coefficient may be determined from the test image. The camera EDCM may be configured of various luminance systems or optical systems.

The test controller EDCC may control the pixels of the display device DD to display the test image. The test controller EDCC may be configured as a general-purpose or dedicated computing device. The computing device may include a recording medium and a processor. The recording medium and the processor may be physically included in the same device, but may also be physically included in different devices by using cloud technology.

The recording media includes all types of recording devices that may store data or programs that may be read by the processor. Examples of the recording media that may be read by the processor include ROM, RAM, CD-ROM, magnetic tape, floppy disk, optical data storage device, hard disk, external hard disk, SSD, USB storage device, DVD and a Blu-ray disk. In addition, the recording medium that may be read by the processor may be a combination of multiple devices or may be distributed in a computer system connected to a network. This recording medium may be a non-transitory computer readable medium. The non-transitory computer readable medium refers to a medium that stores data or a program semi-permanently and is readable by a processor, rather than a medium that stores data or a program for a short period of time, such as a register, a cache, and a memory.

Figure 6:
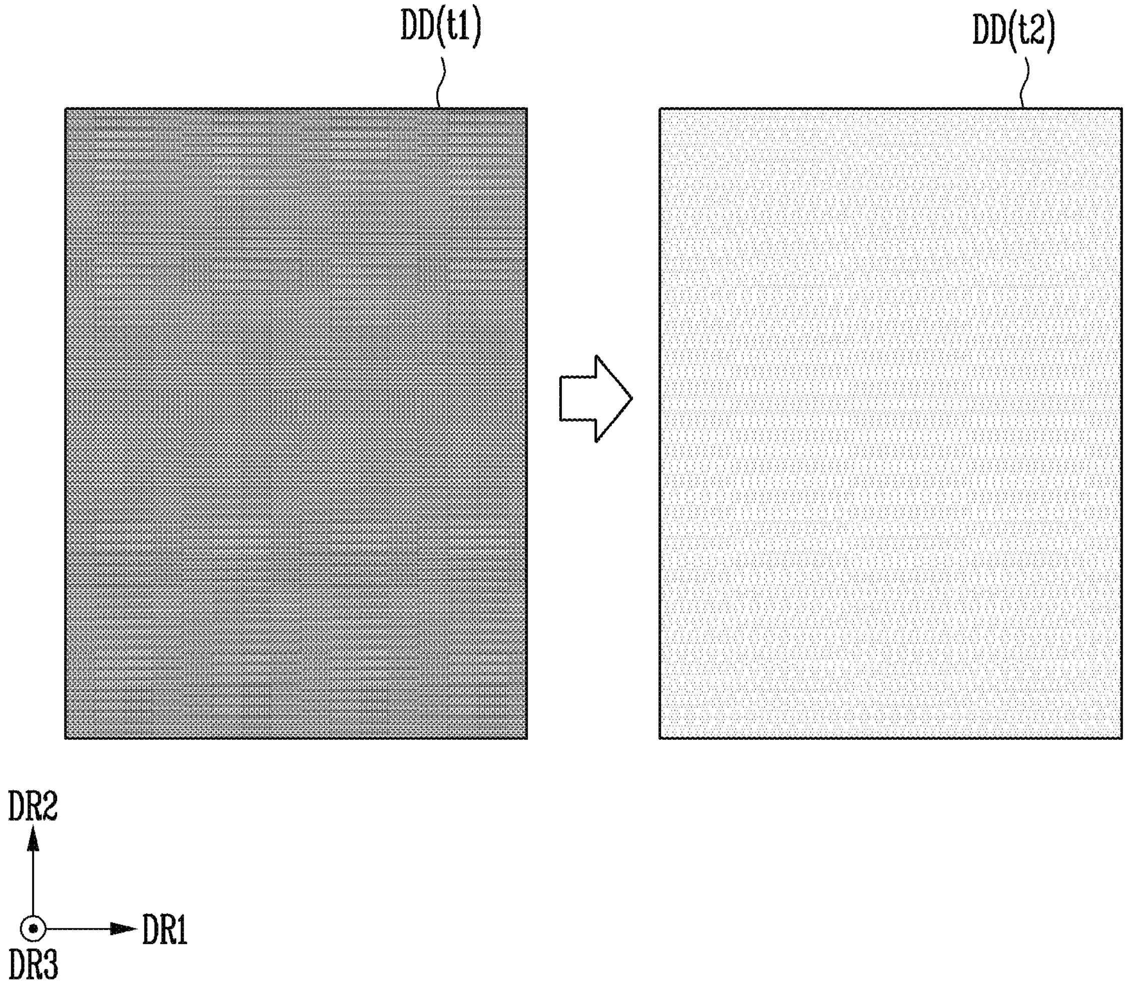

Referring to FIG. 6, the display device DD displays an image of black grayscale at a first time point t1, maintains the image of black grayscale until a second time point t2, and displays an image of intermediate grayscale (for example, 48 grayscale) at the second time point t2 after the first time point t1. The intermediate grayscale is not limited to a value of 48 grayscale, and may be a different value larger than the black grayscale, but smaller than a white grayscale. Examples of the black grayscale include a 0 grayscale or a small grayscale less than 5 grayscale. One or more of these displayed images may correspond to the above-described test image.

Figure 7:
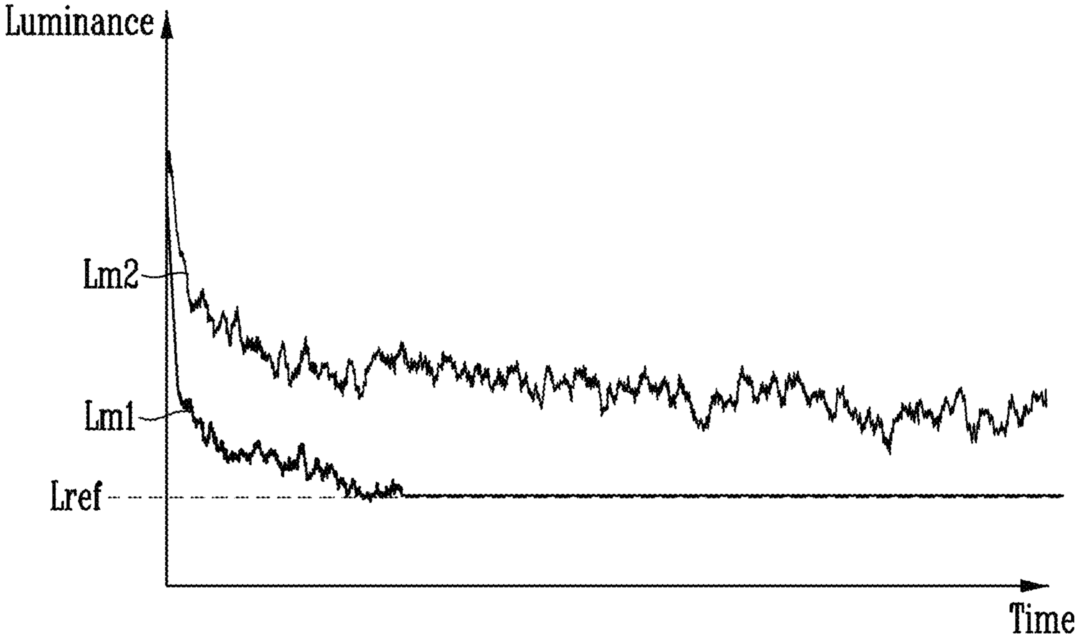

Referring to FIG. 7, the luminance of the display device DD measured from the second time point t2 is shown. In the case in which the black grayscale image is converted into the image of 48 grayscale, a luminance corresponding to a grayscale higher than 48 grayscales may be instantly measured in the display device DD due to an afterimage. A first luminance graph Lm1 may be a case in which a period from the first time point t1 to the second time point t2 is relatively short (for example, 90 seconds), and a second luminance graph Lm2 may be a case in which a period from the first time point t1 to the second time point t2 is relatively long (for example, 30 minutes). Reference luminance Lref is an ideal luminance corresponding to 48 grayscale when a sufficiently long time has passed from the second time point t2 and the afterimage disappears.

When the reference luminance Lref is subtracted from the first luminance graph Lm1, this may be referred to as a short-term afterimage graph. When the first luminance graph Lm1 is subtracted from the second luminance graph Lm2, this may be referred to as a mid-to long-term afterimage graph.

Figure 8:
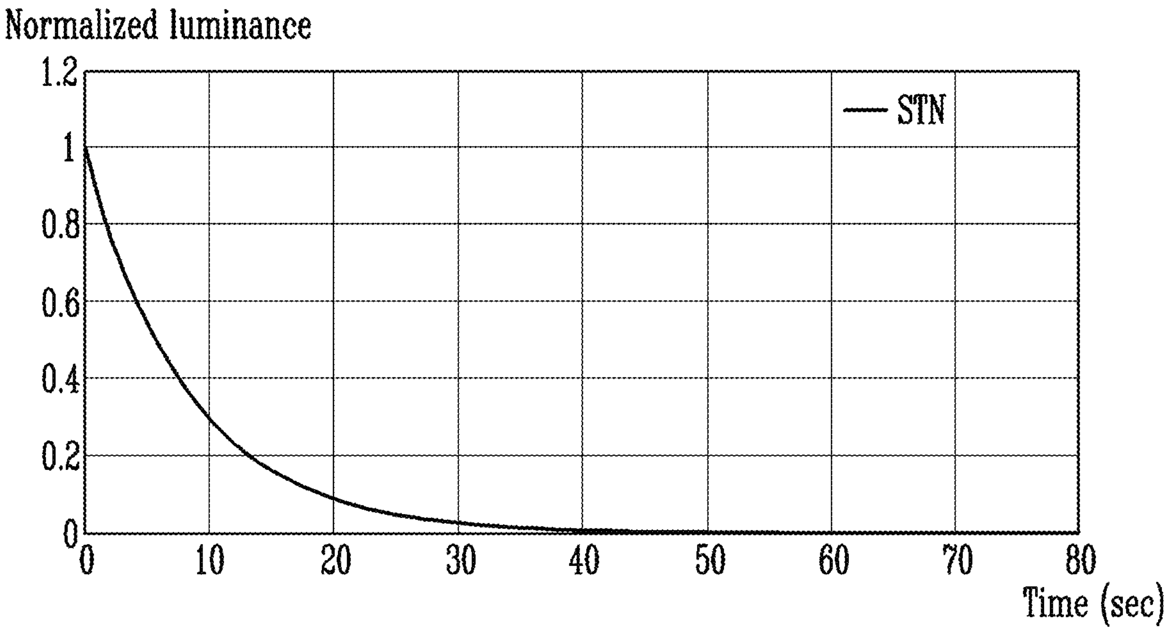

Referring to FIG. 8, a short-term afterimage graph STN with normalized luminance is shown.

Figure 9:
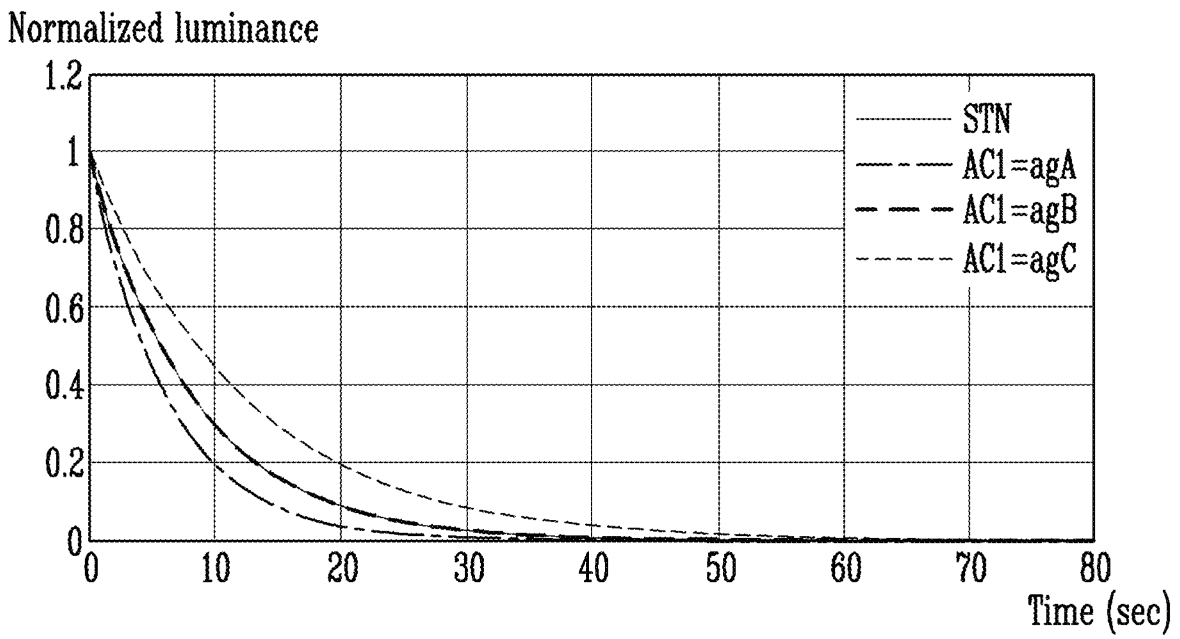

Referring to FIG. 9, after modeling the graph to correspond to the short-term afterimage graph STN, an appropriate first accumulation coefficient AC1 may be obtained. For example, the first accumulation coefficient AC1 may be a parameter that determines the slope of the graph. For example, the larger the first accumulation coefficient AC1, the smaller the change in the slope of the graph over time may be, and the smaller the first accumulation coefficient AC1, the larger the change in the slope of the graph over time may be.

For example, in FIG. 9, the graph model when the first accumulation coefficient AC1 is agB is most similar to the short-term afterimage graph STN. Accordingly, the first accumulation coefficient AC1 may be determined as agB.

In FIG. 8 and FIG. 9, the method of obtaining the first accumulation coefficient AC1 based on the short-term afterimage graph STN is described, but the method of obtaining the second accumulation coefficient based on the mid-to long-term afterimage graph is also substantially the same, so redundant descriptions are omitted. Since the mid-to long-term afterimage graph is gentler than the short-term afterimage graph STN, the second accumulation coefficient may be greater than the first accumulation coefficient AC1.

Figure 10:
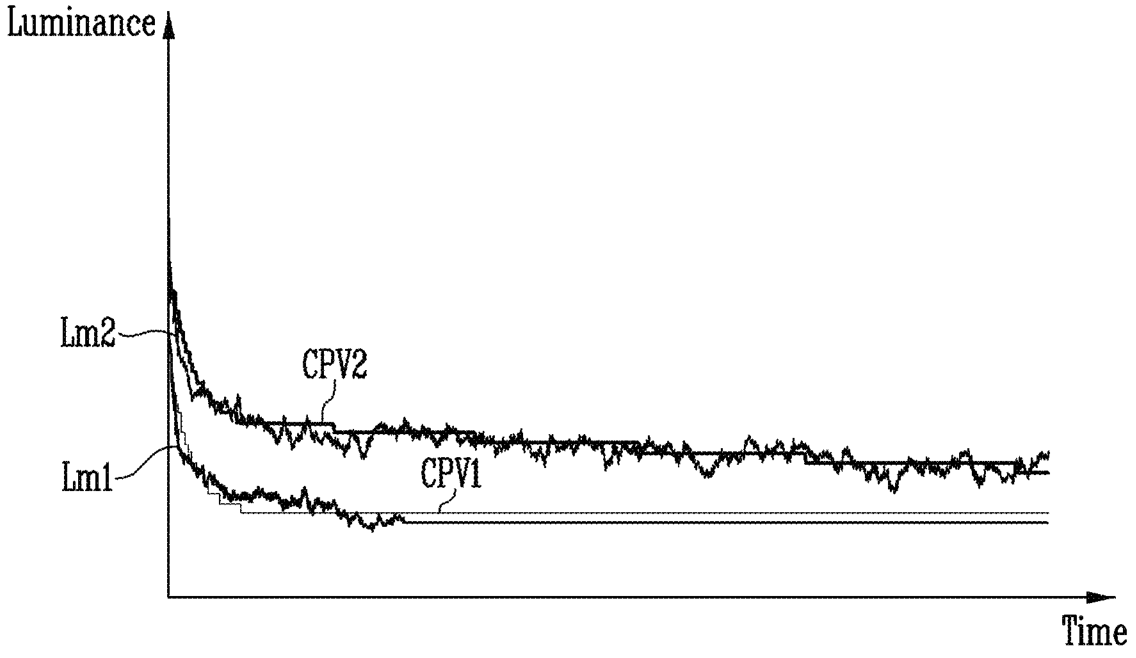

Referring to FIG. 10, it may be observed that the first luminance graph Lm1 and the compensation value CPV1 corresponding to the short-term afterimage match well. Referring to FIG. 10, it may be observed that the second luminance graph Lm2 and the compensation value CPV2 corresponding to the mid-to long-term afterimage match well.

Figure 11:
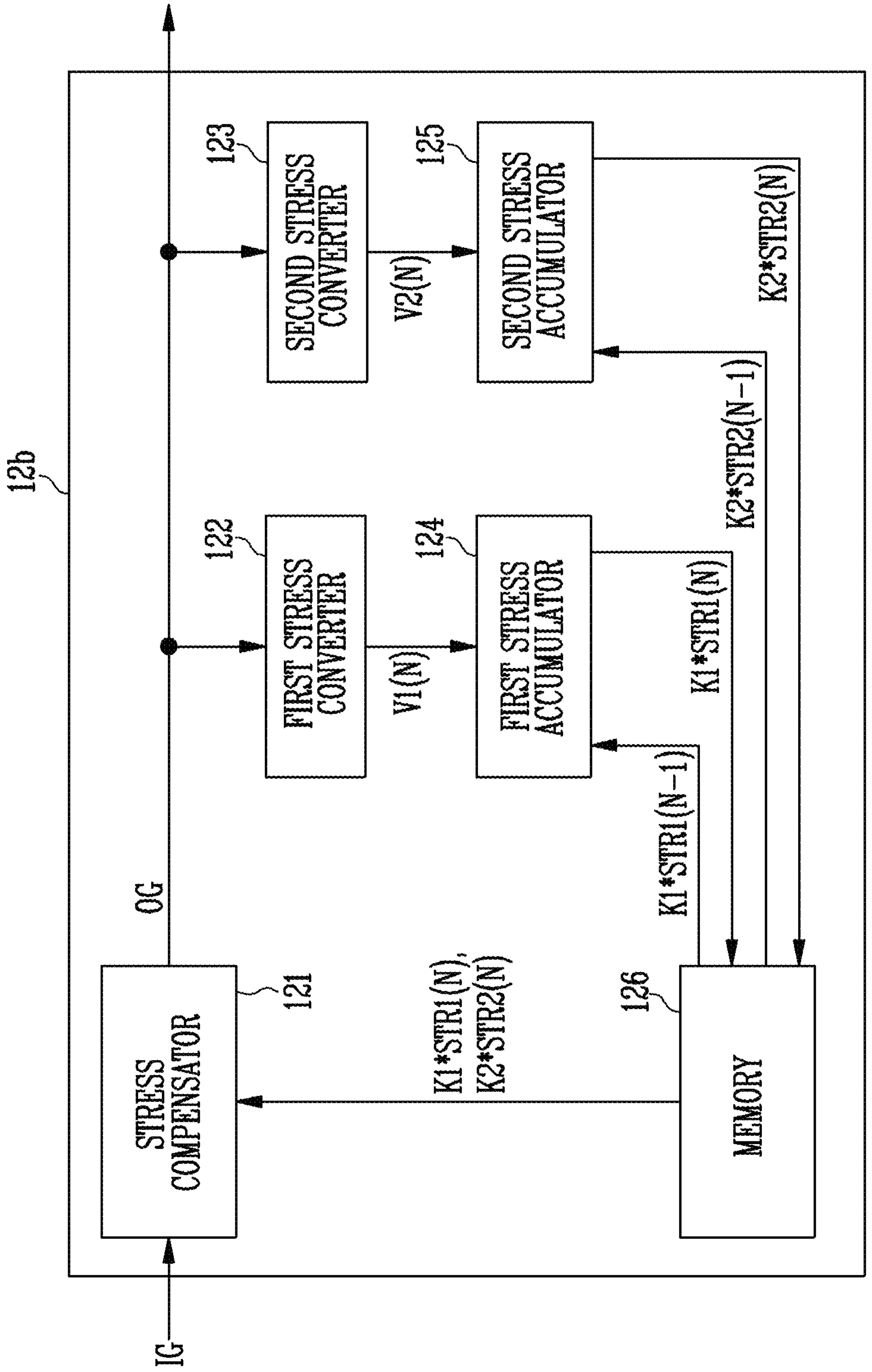
FIG. 11 is a drawing of a grayscale converter of the display device according to another embodiment of the present disclosure.

FIG. 11 is a drawing illustrating a grayscale converter according to an embodiment of the present disclosure.

In describing a grayscale converter 12*b* of FIG. 11, descriptions that are redundant to the grayscale converter 12*a* of FIG. 4 will be omitted.

The memory 126 may store the first conversion accumulation value K1*STR1(N−1) obtained by applying the first weight K1 to the first stress accumulation value STR1(N−1) and the second conversion accumulation value K2 (N−1) obtained by applying the second weight K2 to the second stress accumulation value STR2(N−1) (see Equation 3). As described above, each of the first weight K1 and the second weight K2 may be a number greater than 0 and less than 1. Accordingly, the first conversion accumulation value K1*STR1(N−1) may be smaller than the first stress accumulation value STR1(N−1), and the second conversion accumulation value K2*STR2(N−1) may be smaller than the second stress accumulation value STR2(N−1). Therefore, the memory 126 in FIG. 11 may be configured with a smaller capacity than the memory 126 in FIG. 4.

The first stress accumulator 124 may calculate the first stress accumulation value STR1(N−1) by applying (for example, multiplying) the reciprocal number 1/K1 of the first weight K1 by the first conversion accumulation value K1*STR1(N−1). The first stress accumulator 124 may add the first stress V1(N) to the first stress accumulation value STR1(N−1) to which the first accumulation coefficient AC1 is applied to update the first stress accumulation value STR1(N). In this case, the memory 126 may store the first conversion accumulation value K1*STR1(N) obtained by applying the first weight K1 to the updated first stress accumulation value STR1(N).

The second stress accumulator 125 may calculate the second stress accumulation value STR2(N−1) by applying the reciprocal number 1/K2 of the second weight K2 to the second conversion accumulation value K2*STR2(N−1). The second stress accumulator 125 may add the second stress V2(N) to the second stress accumulation value STR2(N−1) to which the second accumulation coefficient AC2 is applied to update the second stress accumulation value STR2(N). In this case, the memory 126 may store the second conversion accumulation value K2*STR2(N) obtained by applying the second weight K2 to the updated second stress accumulation value STR2(N).

The stress compensator 121 may generate a compensation value based on the first conversion accumulation value K1*STR1(N) and the second conversion accumulation value K2*STR2(N).

According to an embodiment, the memory 126 in FIG. 11 is configured with a smaller capacity than the memory 126 in FIG. 4.

Figure 12:
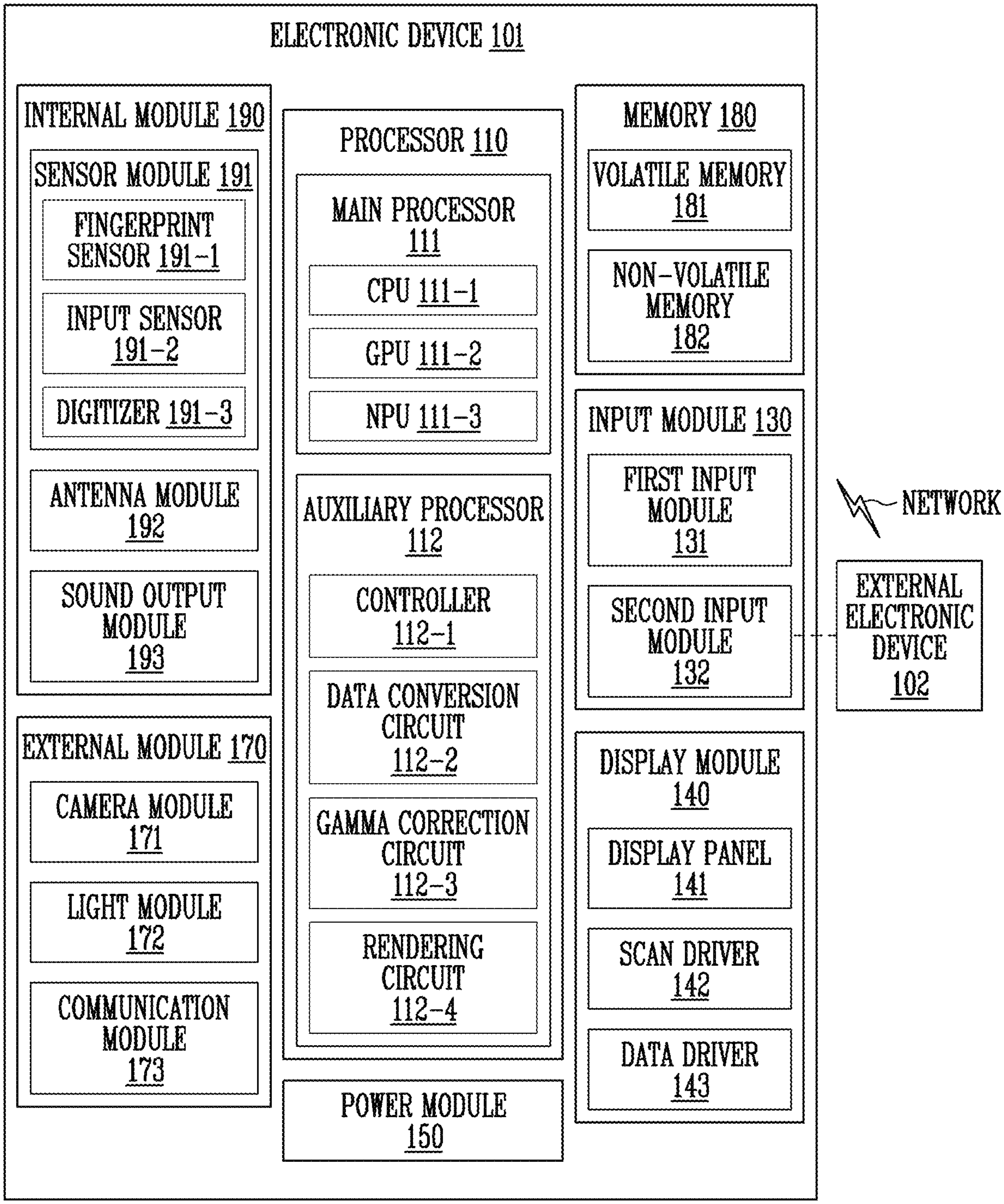
FIG. 12 is a block diagram of an electronic device according to an embodiment of the present disclosure.

FIG. 12 is a block diagram of an electronic device according to an embodiment of the present disclosure.

An electronic device 101 may output various information through a display module 140 using an operating system. When a processor 110 executes an application stored in a memory 180, the display module 140 provides application information to a user through a display panel 141.

The processor 110 obtains external input through an input module 130 or a sensor module 191 and executes an application corresponding to the external input. For example, when a user selects a camera icon displayed on the display panel 141, the processor 110 obtains user input through an input sensor 191-2 and activates a camera module 171. The processor 110 transmits image data corresponding to a captured image obtained through the camera module 171 to the display module 140. The display module 140 may display an image corresponding to the captured image through the display panel 141.

As another example, when personal information authentication is executed in the display module 140, a fingerprint sensor 191-1 obtains inputted fingerprint information as input data. The processor 110 compares the inputted data obtained through the fingerprint sensor 191-1 with authentication data stored in the memory 180, and executes an application according to the compared result. The display module 140 may display information executed according to application logic through the display panel 141.

As another example, when a music streaming icon displayed on the display module 140 is selected, the processor 110 obtains user input through the input sensor 191-2 and activates a music streaming application stored in the memory 180. When a music execution instruction is inputted from the music streaming application, the processor 110 activates a sound output module 193 to provide sound information corresponding to the music execution instruction to the user.

In the above, the operation of the electronic device 101 has been briefly described. Hereinafter, a configuration of the electronic device 101 will be described in detail. Some of components of the electronic device 101 to be described later may be integrated and provided as one component, and one component thereof may be divided and provided as two or more components.

Referring to FIG. 12, the electronic device 101 may communicate with an external electronic device 102 through a network (for example, a short range wireless communication network or a long range wireless communication network). According to the embodiment, the electronic device 101 may include the processor 110, the memory 180, the input module 130, the display module 140, a power module 150, an embedded module 190, and an external module 170. According to the embodiment, in the electronic device 101, at least one of the aforementioned constituent elements may be omitted, or one or more other constituent elements may be added. According to the embodiment, some (for example, the sensor module 191, an antenna module 192, or a sound output module 193) of the aforementioned constituent elements may be integrated into another constituent element (for example, the display module 140).

The processor 110 may execute software to control at least one other constituent element (for example, a hardware or software constituent element) of the electronic device 101 connected to the processor 110, and may perform various data processing or calculations. According to the embodiment, as at least some of the data processing or operation, the processor 110 may store an instruction or data received from other constituent element (for example, the input module 130, the sensor module 191, or a communication module 173) in a volatile memory 181, may process the instructions or data stored in the volatile memory 181, and may store the result data in a non-volatile memory 182.

The processor 110 may include a main processor 111 and an auxiliary processor 112. The main processor 111 may include one or more of a central processing unit (CPU) 111-1 and an application processor (AP). The main processor 111 may further include one or more of a graphic processing unit (GPU) 111-2, a communication processor (CP), and an image signal processor (ISP). The main processor 111 may further include a neural processing unit (NPU) 111-3. The neural processing unit is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, and a combination of two or more thereof, but is not limited to the above example. The artificial intelligence models may additionally or alternatively include a software structure in addition to the hardware structure thereof. At least two of the aforementioned processing units and processors may be implemented as an integrated component (for example, a single chip), or each thereof may be implemented as an independent component (for example, a plurality of chips). The grayscale converter 12 of FIG. 1 may be implemented as a partial function of the processor 110.

The auxiliary processor 112 may include a controller 112-1

The controller 112-1 may include an interface conversion circuit and a timing control circuit. The controller 112-1 receives an image signal from the main processor 111, and converts a data format of the image signal to meet an interface specification with the display module 140 to output image data. The controller 112-1 may output various control signals necessary for driving the display module 140. The controller 11 of FIG. 1 may correspond to the controller 112-1 of FIG. 12. As described above, the grayscale converter 12 of FIG. 1 may be manufactured as a single IC with the controller 11, so the grayscale converter 12 may correspond to the controller 112-1.

The auxiliary processor 112 may further include a data conversion circuit 112-2, a gamma correction circuit 112-3, a rendering circuit 112-4 and the like. The data conversion circuit 112-2 may receive image data from the controller 112-1 and it may compensate the image data to display the image with a desired luminance according to characteristics of the electronic device 101 or a user's setting, or convert the image data to reduce power consumption or compensate for an afterimage. The gamma correction circuit 112-3 may convert the image data or gamma reference voltage so that the image displayed on the electronic device 101 has a desired gamma characteristic. The rendering circuit 112-4 may receive image data from the controller 112-1 and render the image data in consideration of pixel disposition of the display panel 141 of the electronic device 101. At least one of the data conversion circuit 112-2, the gamma correction circuit 112-3 and the rendering circuit 112-4 may be incorporated into another constituent element (for example, the main processor 111 or the controller 112-1). At least one of the data conversion circuit 112-2, the gamma correction circuit 112-3 and the rendering circuit 112-4 may be integrated into a data driver 143 to be described later.

The memory 180 may store various data used by at least one constituent element (for example, the processor 110 or the sensor module 191) of the electronic device 101, and input data or output data for an instruction related thereto. The memory 180 may include at least one or more of the volatile memory 181 and the non-volatile memory 182.

The input module 130 may receive an instruction or data to be used for a constituent element (for example, the processor 110, the sensor module 191, or the sound output module 193) of the electronic device 101 from the outside of the electronic device 101 (for example, a user or the external electronic device 102).

The input module 130 may include a first input module 131 to which an instruction or data is inputted from a user and a second input module 132 to which an instruction or data is inputted from the external electronic device 102. The first input module 131 may include a microphone, a mouse, a keyboard, a key (for example, a button), or a pen (for example, a passive pen or active pen). The second input module 132 may support a designated protocol that may be connected to the external electronic device 102 by wire or wirelessly. According to the embodiment, the second input module 132 may include a high definition multimedia interface (HDMI), a universal serial bus (USB) interface, an SD card interface, or an audio interface. The second input module 132 may include a connector that may be physically connected to the external electronic device 102, for example, an HDMI connector, a USB connector, an SD card connector, or an audio connector (for example, a headphone connector).

The display module 140 visually provides information to the user. The display module 140 may include a display panel 141, a scan driver 142, and a data driver 143. The display module 140 may further include a window, a chassis, and a bracket to protect the display panel 141.

The display panel 141 may include a liquid crystal display panel, an organic light emitting display panel, or an inorganic light emitting display panel, but the type of display panel 141 is not limited thereto. The display panel 141 may be a rigid type, or a flexible type that may be rolled or folded. The display module 140 may further include a supporter, a bracket, or a heat dissipation member for supporting the display panel 141.

The scan driver 142 may be mounted on the display panel 141 as a driving chip. In addition, the scan driver 142 may be integrated in the display panel 141. For example, the scan driver 142 includes an amorphous silicon TFT gate driver circuit (ASG), a low temperature polycrystalline silicon (LTPS) TFT gate driver circuit, or an oxide semiconductor TFT gate driver circuit (OSG) that is embedded in the display panel 141. The scan driver 142 receives a control signal from the controller 112-1, and outputs scan signals to the display panel 141 in response to the control signal.

The display panel 141 may further include a light emission driver (e.g., 15). The light emission driver outputs a light emitting control signal to the display panel 141 in response to the control signal received from the controller 112-1

The light emission driver may be formed separately from the scan driver 142, or may be integrated in the scan driver 142.

The data driver 143 receives a control signal from the controller 112-1, converts image data into an analog voltage (for example, a data voltage) in response to the control signal, and then outputs data voltages to the display panel 141.

The data driver 143 may be incorporated into other constituent elements (for example, the controller 112-1). The functions of the interface conversion circuit and the timing control circuit of the controller 112-1 described above may be integrated into the data driver 143.

The display module 140 may further include a light emission driver (e.g., 15) and a voltage generating circuit. The voltage generating circuit may output various voltages (e.g., first and second power source voltages) required for driving the display panel 141.

The power module 150 supplies power to the constituent elements of the electronic device 101. The power module 150 may include a battery in which a power voltage is charged. The battery may include a non-rechargeable primary battery, or a rechargeable battery or fuel cell. The power module 150 may include a power management integrated circuit (PMIC). The PMIC supplies optimized power to each of the above-described modules and modules to be described later. The power module 150 may include a wireless power transmission/reception member electrically connected to a battery. The wireless power transmission/reception member may include a plurality of antenna radiators in a form of a coil.

The electronic device 101 may further include an internal module 190 and an external module 170. The internal module 190 may include the sensor module 191, the antenna module 192, and the sound output module 193. The external module 170 may include the camera module 171, a light module 172, and the communication module 173.

The sensor module 191 may sense input by a user's body or input by a pen among the first input module 131, and may generate an electrical signal or a data value corresponding to the input. The sensor module 191 may include at least one or more of the fingerprint sensor 191-1, the input sensor 191-2 and the digitizer 191-3.

The fingerprint sensor 191-1 may generate a data value corresponding to a user's fingerprint. The fingerprint sensor 191-1 may include either an optical type or a capacitive type fingerprint sensor.

The input sensor 191-2 may generate a data value corresponding to coordinate information of input by the user's body or input by the pen. The input sensor 191-2 generates an amount of change in capacitance by the input as a data value. The input sensor 191-2 may sense input by the passive pen, or may transmit/receive data with the active pen.

The input sensor 191-2 may measure a biosignal such as blood pressure, water, or body fat. For example, when the user touches a part of the body to the sensor layer or the sensing panel and does not move for a certain period of time, based on a change in an electric field by the part of the body, the input sensor 191-2 may sense a biosignal and output desired information to the display module 140.

The digitizer 191-3 may generate a data value corresponding to coordinate information of a pen input. The digitizer 191-3 may generate an electromagnetic change amount by the input as a data value. The digitizer 191-3 may sense input by the passive pen, or may transmit/receive data with the active pen.

At least one of the fingerprint sensor 191-1, the input sensor 191-2 and the digitizer 191-3 may be implemented as a sensor layer disposed on the display panel 141 through a continuous process. The fingerprint sensor 191-1, the input sensor 191-2 and the digitizer 191-3 may be disposed at an upper side of the display panel 141, and one of the fingerprint sensor 191-1 the input sensor 191-2 and the digitizer 191-3, for example, the digitizer 191-3 may be disposed at a lower side of the display panel 141.

At least two or more of the fingerprint sensor 191-1, the input sensor 191-2 and the digitizer 191-3 may be integrated into one sensing panel through the same process. When integrated into one sensing panel, the sensing panel may be disposed between the display panel 141 and a window disposed at an upper side of the display panel 141. According to an embodiment, the sensing panel may be disposed on the window, but the position of the sensing panel is not limited thereto.

At least one of the fingerprint sensor 191-1, the input sensor 191-2 and the digitizer 191-3 may be embedded in the display panel 141. That is, at least one of the fingerprint sensor 191-1, the input sensor 191-2 and the digitizer 191-3 may be simultaneously formed through the process of forming elements (for example, a light emitting element, a transistor, and the like) included in the display panel 141.

In addition, the sensor module 191 may generate an electrical signal or a data value corresponding to an internal state or an external state of the electronic device 101. The sensor module 191 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 192 may include one or more antennas for transmitting or receiving a signal or power to or from the outside. According to the embodiment, the communication module 173 may transmit a signal to an external electronic device or receive a signal from an external electronic device through an antenna suitable for a communication method. An antenna pattern of the antenna module 192 may be integrated into one component (for example, the display panel 141) of the display module 140 or the input sensor 191-2.

The sound output module 193 is a device for outputting a sound signal to the outside of the electronic device 101, and may include, for example, a speaker used for general purposes such as multimedia playback or recording playback, and a receiver used exclusively for receiving calls. According to the embodiment, the receiver may be provided integrally with or separately from the speaker. A sound output pattern of the sound output module 193 may be integrated into the display module 140.

The camera module 171 may capture still images and moving images. According to the embodiment, the camera module 171 may include one or more lenses, image sensors, or image signal processors. The camera module 171 may further include an infrared camera capable of measuring the presence or absence of the user, the position of the user, and the gaze of the user.

The light module 172 may provide light. The light module 172 may include a light emitting diode or a xenon lamp. The light module 172 may operate in conjunction with the camera module 171 or may operate independently.

The communication module 173 may support establishment of a wired or wireless communication channel between the electronic device 101 and the external electronic device 102, and communication through the established communication channel. The communication module 173 may include one or both of a wireless communication module, such as a cellular communication module, a short range communication module, or a global navigation satellite system (GNSS) communication module and a wired communication module such as a local area network (LAN) communication module or a power line communication module. The communication module 173 may communicate with the external electronic device 102 through a short range communication network such as Bluetooth, WiFi direct, or infrared data association (IrDA) or a long range communication network such as a cellular network, the Internet, or a computer network (for example, LAN or WAN). The various types of the communication modules 173 described above may be implemented as a single chip or may be implemented as separate chips.

The input module 130, the sensor module 191, the camera module 171, and the like may be used to control an operation of the display module 140 in conjunction with the processor 110.

The processor 110 outputs an instruction or data to the display module 140, the sound output module 193, the camera module 171, or the light module 172 based on input data received from the input module 130. For example, the processor 110 may generate image data in response to input data applied through a mouse or an active pen to output it to the display module 140, or may generate instruction data in response to the input data to output it to the camera module 171 or light module 172. When input data is not received from the input module 130 for a certain period of time, the processor 110 may reduce power consumed by the electronic device 101 by changing an operation mode of the electronic device 101 to a low power mode or a sleep mode.

The processor 110 outputs an instruction or data to the display module 140, the sound output module 193, the camera module 171, or the light module 172 based on sensing data received from the sensor module 191. For example, the processor 110 may compare authentication data applied by the fingerprint sensor 191-1 with authentication data stored in the memory 180 and then execute an application according to the compared result. The processor 110 may execute an instruction based on sensed data sensed by the input sensor 191-2 or the digitizer 191-3 or may output corresponding image data to the display module 140. When the sensor module 191 includes a temperature sensor, the processor 110 may receive temperature data for a measured temperature from the sensor module 191, and may further perform luminance correction on image data based on the temperature data.

The processor 110 may receive measurement data about the presence of a user, a user's position, a user's gaze, and the like, from the camera module 171. The processor 110 may further perform luminance correction and the like on image data based on the measurement data. For example, the processor 110 that determines the presence of a user through an input from the camera module 171 may output image data to the display module 140 whose luminance is corrected through the data conversion circuit 112-2 or the gamma correction circuit 112-3.

Some of the above constituent elements may be connected to each other through a communication method between peripheral devices, for example, a bus, a general purpose input/output (GPIO), a serial peripheral interface (SPI), a mobile industry processor interface (MIPI), or an ultra path interconnect (UPI) link to exchange a signal (for example, an instruction or data) with each other. The processor 110 may communicate with the display module 140 through a mutually agreed interface, for example, may use one of the above-described communication methods, but is not limited to the above-described communication methods.

The electronic device 101 according to various embodiments disclosed in the present specification may be devices of various types. The electronic device 101 may include, for example, at least one of a portable communication device (for example, a smartphone), a computer device, a portable multimedia device, a portable medical device, a camera, a wearable device, or a home appliance. The electronic device 101 according to the embodiment of the present specification is not limited to the above-described devices.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the present disclosure are possible.

What is claimed is:

1. A display device comprising:

a pixel;

a grayscale converter that applies a compensation value to an input grayscale to generate an output grayscale; and a controller that provides a data voltage corresponding to the output grayscale to the pixel, wherein the grayscale converter generates a first stress value and a second stress value based on the output grayscale, adds the first stress value to a first stress accumulation value to which a first accumulation coefficient is applied to update the first stress accumulation value, adds the second stress value to a second stress accumulation value to which a second accumulation coefficient is applied to update the second stress accumulation value, and generates the compensation value based on the first stress accumulation value and the second stress accumulation value, and wherein the first accumulation coefficient and the second accumulation coefficient are different from each other.

2. The display device of claim 1, wherein the first accumulation coefficient is a preset parameter assuming that the data voltage is applied to the pixel during a first period, the second accumulation coefficient is a preset parameter assuming that the data voltage is applied to the pixel during a second period, and wherein the second period is longer than the first period.

3. The display device of claim 2, wherein the second accumulation coefficient is greater than the first accumulation coefficient.

4. The display device of claim 1, wherein the grayscale converter generates the compensation value based on a first conversion accumulation value obtained by applying a first weight to the first stress accumulation value and a second conversion accumulation value obtained by applying a second weight to the second stress accumulation value.

5. The display device of claim 4, further comprising a memory that stores the first conversion accumulation value and the second conversion accumulation value, wherein the first conversion accumulation value is smaller than the first stress accumulation value, and the second conversion accumulation value is smaller than the second stress accumulation value.

6. The display device of claim 5, wherein the grayscale converter calculates the first stress accumulation value by applying a reciprocal of the first weight to the first conversion accumulation value read from the memory.

7. The display device of claim 6, wherein the grayscale converter calculates the second stress accumulation value by applying a reciprocal of the second weight to the second conversion accumulation value read from the memory.

8. The display device of claim 1, wherein the grayscale converter comprises:

a first logic circuit that converts the output grayscale into the first stress value of a voltage domain;

a second logic circuit that converts the output grayscale into the second stress value of the voltage domain;

a memory in which a first conversion accumulation value obtained by applying a first weight to the first stress accumulation value and a second conversion accumulation value obtained by applying a second weight to the second stress accumulation value are stored;

a first accumulator that applies the reciprocal of the first weight to the first conversion accumulation value to calculate the first stress accumulation value and that adds the first stress value to the first stress accumulation value to which the first accumulation coefficient is applied to update the first stress accumulation value;

a second accumulator that applies the reciprocal of the second weight to the second conversion accumulation value to calculate the second stress accumulation value and that adds the second stress value to the second stress accumulation value to which the second accumulation coefficient is applied to update the second stress accumulation value; and a third logic circuit that generates the compensation value based on the first conversion accumulation value and the second conversion accumulation value.

9. The display device of claim 8, wherein a number of bits representing the first stress value and a number of bits representing the second stress value are different.

10. The display device of claim 9, wherein the number of bits representing the first stress value is greater than the number of bits representing the second stress value.

11. A driving method of a display device, comprising:

generating a first stress value and a second stress value based on a grayscale for a current frame;

adding the first stress value to a first stress accumulation value to which a first accumulation coefficient is applied to update the first stress accumulation value;

adding the second stress value to a second stress accumulation value to which a second accumulation coefficient is applied to update the second stress accumulation value;

generating a compensation value based on the first stress accumulation value and the second stress accumulation value;

applying the compensation value to a grayscale for a next frame to generate an output grayscale; and providing a data voltage corresponding to the output grayscale to a pixel of the display device, and wherein the first accumulation coefficient and the second accumulation coefficient are different from each other.

12. The driving method of the display device of claim 11, wherein the first accumulation coefficient is a preset parameter assuming that the data voltage is applied to the pixel during a first period, the second accumulation coefficient is a preset parameter assuming that the data voltage is applied to the pixel during a second period, and wherein the second period is longer than the first period.

13. The driving method of the display device of claim 12, wherein the second accumulation coefficient is greater than the first accumulation coefficient.

14. The driving method of the display device of claim 11, wherein the compensation value is generated based on a first conversion accumulation value obtained by applying a first weight to the first stress accumulation value and a second conversion accumulation value obtained by applying a second weight to the second stress accumulation value.

15. The driving method of the display device of claim 14, wherein the display device includes a memory that stores the first conversion accumulation value and the second conversion accumulation value, the first conversion accumulation value is smaller than the first stress accumulation value, and the second conversion accumulation value is smaller than the second stress accumulation value.

16. The driving method of the display device of claim 15, wherein the first stress accumulation value is calculated by applying a reciprocal of the first weight to the first conversion accumulation value read from the memory.

17. The driving method of the display device of claim 16, wherein the second stress accumulation value is calculated by applying a reciprocal of the second weight to the second conversion accumulation value read from the memory.

18. The driving method of the display device of claim 11, wherein the generating of the compensation value comprises:

converting the grayscale for the current frame into the first stress value of a voltage domain;

converting the grayscale for the current frame into the second stress value of the voltage domain;

reading the first conversion accumulation value and the second conversion accumulation value;

applying the reciprocal of the first weight to the first conversion accumulation value to calculate the first stress accumulation value, and adding the first stress value to the first stress accumulation value to which the first accumulation coefficient is applied to update the first stress accumulation value;

applying the reciprocal of the second weight to the second conversion accumulation value to calculate the second stress accumulation value, and adding the second stress value to the second stress accumulation value to which the second accumulation coefficient is applied to update the second stress accumulation value;

storing the first conversion accumulation value obtained by applying the first weight to the first stress accumulation value and the second conversion accumulation value obtained by applying the second weight to the second stress accumulation value; and generating the compensation value based on the first conversion accumulation value and the second conversion accumulation value.

19. The driving method of the display device of claim 18, wherein a number of bits representing the first stress value and a number of bits representing the second stress value are different.

20. The driving method of the display device of claim 19, wherein the number of bits representing the first stress value is greater than the number of bits representing the second stress value.

* * * * *